US006256503B1

(12) United States Patent
Stephens

(10) Patent No.: US 6,256,503 B1
(45) Date of Patent: Jul. 3, 2001

(54) METHOD AND SYSTEM IN A WIRELESS COMMUNICATIONS NETWORK FOR PROVIDING RESTRICTED USER TERMINATION AREAS BASED ON ORIGINATOR LOCATION

(75) Inventor: Gary Boyd Stephens, Allen, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 08/890,234

(22) Filed: Jul. 9, 1997

(51) Int. Cl.$^7$ ..................................................... H04Q 7/20
(52) U.S. Cl. ..................... 455/456; 455/414; 455/415; 455/417; 455/445; 579/210; 579/211
(58) Field of Search ..................................... 455/414, 415, 455/417, 445, 456, 404–408, 421, 422, 432, 440, 517–519, 521; 579/210, 211

(56) References Cited

U.S. PATENT DOCUMENTS

| | | | | |
|---|---|---|---|---|
| 4,752,951 | * | 6/1988 | Konneker | 455/456 |
| 5,214,789 | * | 5/1993 | George | 455/440 |
| 5,463,674 | * | 10/1995 | Gillig et al. | 455/417 |
| 5,476,671 | * | 12/1995 | Partridge, III | 455/445 |
| 5,493,286 | * | 2/1996 | Grube et al. | 455/456 |
| 5,506,888 | * | 4/1996 | Hayes et al. | 455/445 |
| 5,568,153 | * | 10/1996 | Beliveau | 455/440 |
| 5,610,970 | * | 3/1997 | Fuller | 455/417 |
| 5,765,108 | * | 6/1998 | Martin et al. | 455/465 |
| 5,809,418 | * | 9/1998 | Tayloe et al. | 455/456 |
| 5,815,814 | * | 9/1998 | Dennison et al. | 455/456 |
| 5,930,699 | * | 7/1999 | Bhatia | 455/414 |

* cited by examiner

Primary Examiner—Tracy Legree
(74) Attorney, Agent, or Firm—John D. Crane; Bracewell & Patterson, L.L.P.

(57) ABSTRACT

A method and system in a wireless communications network are provided for restricting communication transactions based on the geographic location of originators and terminators within the wireless communications network. First, a communications transaction is initiated. In response to an initiation of the communications transaction, a geographic location of an originator of the communications transaction is determined. In response to determining the geographic location of the originator, a geographic location of a terminator of the communications transaction is determined. The geographic location of the originator is thereafter automatically compared to the geographic location of the terminator. The communications transaction is completed based upon a selected proximity of the geographic location of the originator to the geographic location of the terminator. Alternative action to the communications transaction is also provided in response to a lack of proximity of the geographic location of the originator to the geographic location of the terminator.

9 Claims, 14 Drawing Sheets

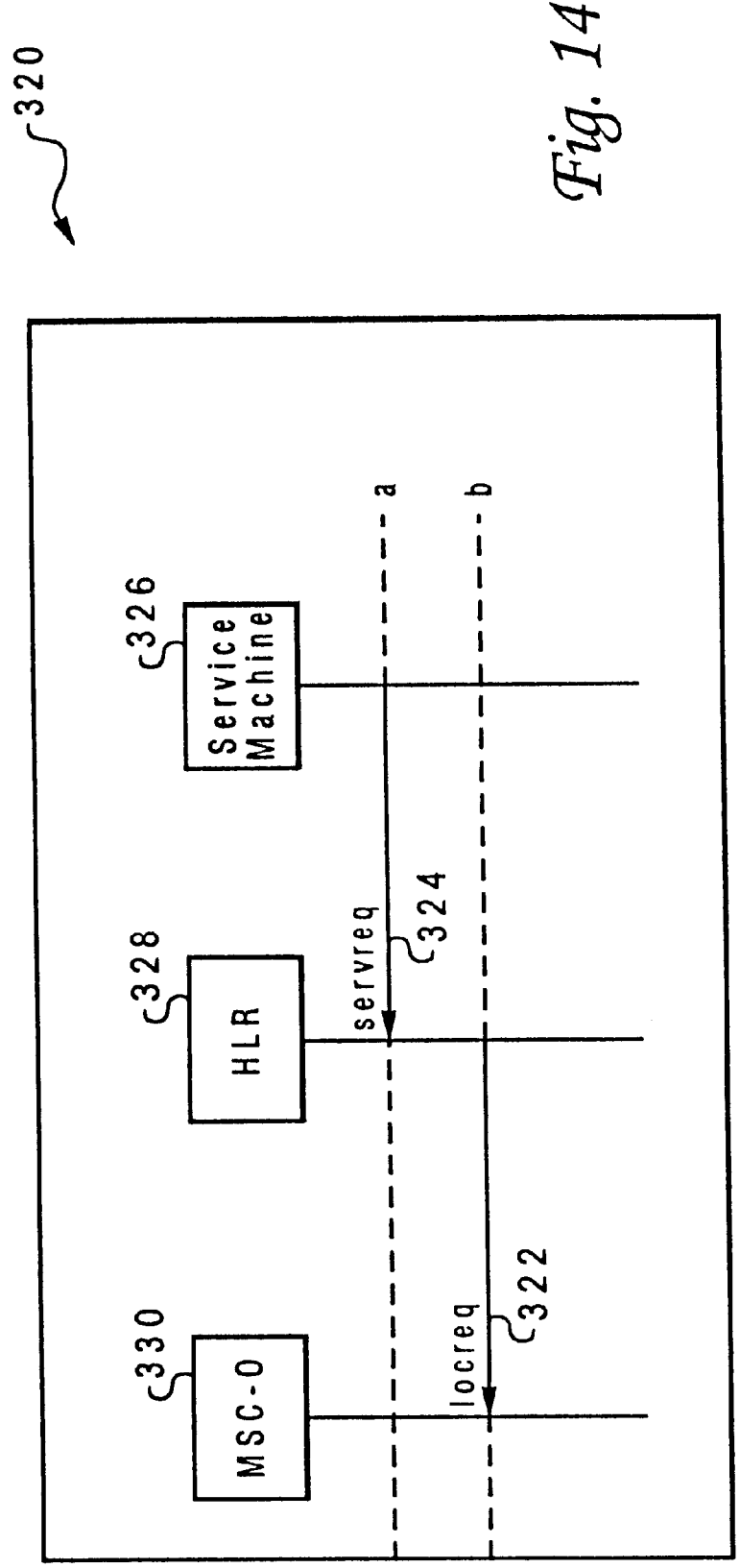

METHOD AND SYSTEM IN A WIRELESS COMMUNICATIONS NETWORK FOR PROVIDING RESTRICTED USER TERMINATION AREAS BASED ON ORIGINATOR LOCATION

BACKGROUND OF THE INVENTION

1. Technical Field

The present invention relates in general to an improved communications system. In particular, the present invention relates to an improved communications system in which wireless mobile communication devices are utilized to initiate communication transactions. Still more particularly, the present invention relates to an improved communications system in which communication transactions occur between originators and terminators.

2. Description of the Related Art

Cordless telephone systems are well-known in the prior art. A cordless telephone system generally includes a portable cordless handset and a cordless base station which is connected to a telephone company phone system by a landline. The cordless base station has an assigned landline telephone number that allows cordless telephone users to place and receive calls using the cordless portable handset within a limited range of the cordless portable base station, such as within the range of an office or home. However, due to the limited range of such systems, a cordless portable handset provides users with only relatively local radio-telephone communication.

Radio-telephone communication outside the range of a cordless telephone system can be provided to users via cellular telephone systems. Cellular radio is a radio-telephone communications system that began to develop rapidly in the early 1980s. Basically, this system is a small-scale, "cellular" version of the communication linkage provided by large radio-broadcasting systems. A metropolitan area can be divided into smaller units, called cells, that can each have a radius of about 13 to 19 km (8 to 12 mi). Depending on the design of a given cellular telephone system, the radius of a cell can range from several hundred feet to approximately 25 miles.

Whatever the case may be, each cell does have its own small radio transmitter. If necessary, a cell can be further subdivided into smaller cells. In this way, the honeycomb pattern of cells can repeatedly utilize the same range of radio frequencies without interfering with one another, so long as neighboring cells do not utilize precisely the same radio channels. Individuals equipped with mobile communication devices such as small mobile telephones can thus utilize this system in the same way that telephone calls can be made with standard carriers.

Computerized switching is essential to the operation of cellular radio, so that when mobile-unit calls are switched from one cell to the next, the transfer in channels occurs without interruption or, at most, a brief delay. The growth of electronic switching systems and the development of microprocessors have made this possible. For each area to be covered by cellular radio, the U.S. Federal Communications Commission (FCC) licenses different types of organizations. For example, one type can be a telephone company, while another, a business that agrees to construct the necessary radio system. In recent years, the FCC has also awarded newer frequency bands that utilize cellular technology.

A cellular telephone system typically includes cellular subscriber units that can be mobile or portable, and cellular base stations which are connected to the public telephone company via one or more cellular switching networks. Each cellular subscriber has an assigned cellular telephone number which allows the user (i.e., the cellular subscriber) to place and receive calls within a widespread range of the cellular base stations, such as throughout a metropolitan area.

Cellular telephone systems are thus based on a structure of associated cells, which are specified geographic areas that (a) are defined for a specific mobile communication system; and (b) each have their own base station and a single controller interconnected with a public telephone network. Cellular telephone systems are particularly advantageous in providing cellular mobile service, a communications service that allows users to access telephone networks from stationary or moving vehicles, and which is based on a combination of radio transmission and telephone switching. Cellular mobile services typically provide communications links to the user by segmenting a large geographic area into many smaller areas (i.e. cells). As a user passes from cell to cell, the cellular mobile service allows calls in progress to be handed over without interruption to adjacent base stations.

Cellular telephone systems are particularly useful in service industries where it is important to maintain client contacts, but not at the expense of the service itself. A user might wish to receive calls from clients when physically close to the client (i.e. an originator). However, if the user is not located in an area physically close to client, the user might otherwise prefer that any calls placed by the client be routed to a dispatcher or message center, while still leaving the line open to clients located nearby. Currently, a user must deactivate the cellular telephone itself (i.e., put the cellular phone in an "off" state). The disadvantage with this approach is that the terminating user of the terminating cellular telephone may not be contacted directly by those clients located nearby who desire the immediate services of the terminating user.

From the foregoing, it can be seen that a need exists for a method and system which allow a terminating user to restrict incoming phone calls based on the geographic location of an originating caller relative to the geographic location of the terminating user.

SUMMARY OF THE INVENTION

It is therefore one object of the present invention to provide an improved communications system.

It is therefore another object of the present invention to provide an improved wireless communications telephone system in which communication transactions occur between originators and terminators.

It is still another object of the present invention to provide an improved wireless communications network that includes restricted user termination areas based on the location of an originator.

It is yet a further object of the present invention to provided an improved wireless communications network such that communication transactions between an originator and terminator can be processed or terminated based on the proximity of the originator to the terminator.

The above and other objects are achieved as is now described. A method and system in a wireless communications network are provided for restricting communication transactions based on the geographic location of originators and terminators within the wireless communications network. First, a communications transaction is initiated. In response to an initiation of the communications transaction, a geographic location of an originator of the communications transaction is determined. In response to determining the geographic location of the originator, a geographic location of a terminator of the communications transaction is determined. The geographic location of the originator is thereafter automatically compared to the geographic location of the terminator. The communications transaction is completed based upon a selected proximity of the geographic location of the originator to the geographic location of the terminator. Alternative action to the communications transaction is also provided in response to a lack of proximity of the geographic location of the originator to the geographic location of the terminator.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 14 depicts a message flow diagram of the flow for delivering call processing instructions in accordance with a preferred embodiment of the present invention.

DETAILED DESCRIPTION OF PREFERRED EMBODIMENT

Figure 1:
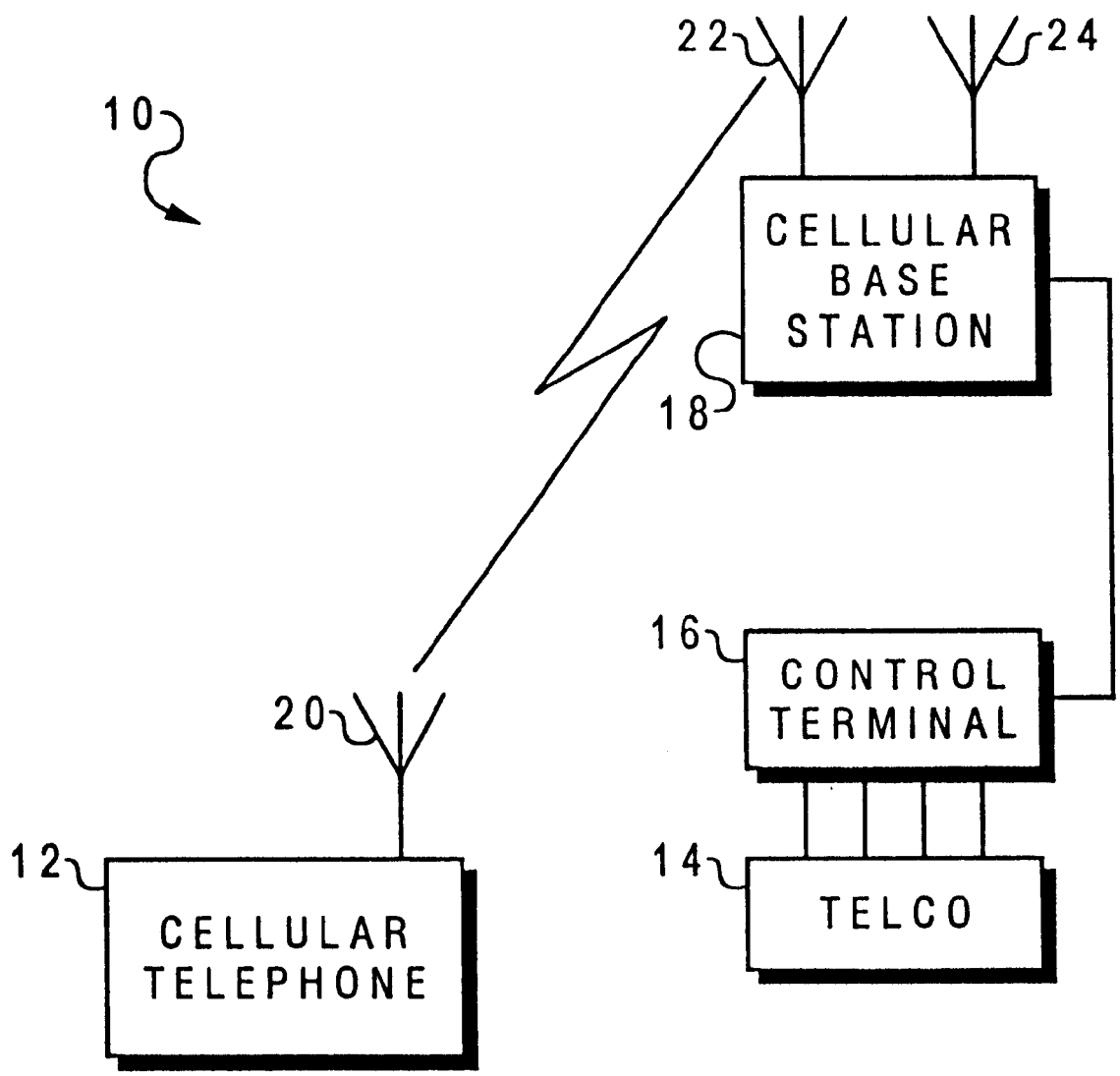
FIG. 1 illustrates a block diagram illustrative of a cellular telephone system in which a preferred embodiment of the present invention may be implemented.

With reference now to the figures and in particular with reference to FIG. 1, there is depicted a block diagram of a cellular telephone system 10 in which a preferred embodiment of the present invention may be implemented. The cellular telephone system 10 depicted in FIG. 1 includes a telephone company phone system (TELCO) 14, connected by telephone landlines to a control terminal 16 which in turn is coupled, also by telephone landlines, to a cellular base station 18 that is located in a cell of a mobile cellular telephone system.

Cellular telephone 12 communicates with cellular base station 18 via antennas 22 and 24. Antennas 22 and 24 can be implemented as telescopic whip antennas that extend or retract (i.e., lengthen or shorten), by being constructed in the form of overlapping concentric cylinders that slide inside of each other and make electrical contact with each other. It will be appreciated by those skilled in the art that such antennas are, of course, only examples of antennas that can be utilized with a cellular telephone system such as cellular telephone system 10. A wide variety of other antennae can also be utilized in conjunction with a wireless communication system such as cellular telephone system 10. Also, the landlines utilized in association with cellular telephone system 10 are lines that can be placed in areas on land or inland waterways, and can include twisted-pair lines, coaxial cables, and fiber optic cables utilized in overhead, direct buried, underground, microwave, and satellite applications.

Additional cellular base stations may be located throughout a geographic area to provide telephone service to cellular telephones 12. Cellular base station 18 incorporates both a receiver antenna 22 and a transmitter antenna 24 for communicating with cellular telephones 12. Cellular telephone 12 may be a mobile-unit installed in a vehicle, a transportable unit which is a mobile-unit and battery installed in a carrying case, or a hand-held portable unit. Cellular telephone 12 includes an antenna 20 for the cellular radio channels. In the United States, the cellular radio channels are in the frequency band from 824–894 MHz. More particularly, in the United States, a total bandwidth of 50 MHz is allocated for cellular mobile service, the 50 MHz distributed between 824 MHz and 849 MHz, and 869 MHz and 894 MHz of the frequency spectrum. Also, recently the FCC has auctioned off bandwidths in the 1.9 GHz range. All of these bands can be utilized in accordance with a preferred embodiment of the present invention.

Figure 2:
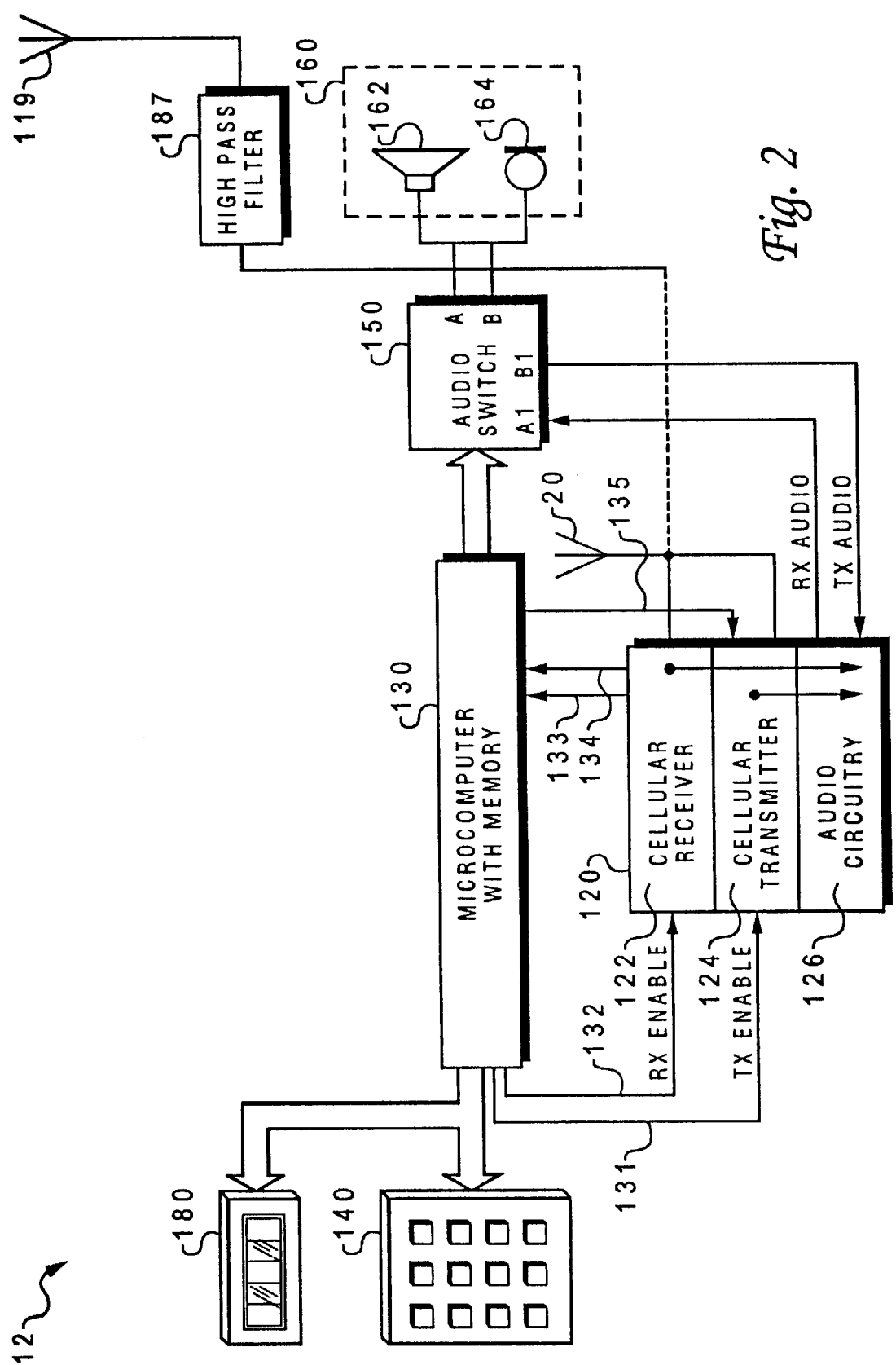
FIG. 2 depicts a block diagram illustrative of a cellular telephone which may be implemented in accordance with a preferred embodiment of the present invention.

FIG. 2 is a block diagram of a cellular telephone 12 which may be implemented in accordance with a preferred embodiment of the present invention. Cellular telephone 12 includes antenna 20, cellular telephone transceiver 120, microcomputer 130, keypad 140, display 180, audio switch 150, and handset 160, including speaker 162 and microphone 164. Microcomputer 130 is a computer built around a single chip microprocessor. Less powerful than minicomputers and mainframe computers, microcomputer 130 is nevertheless capable of complex tasks involving the processing of logical operations. Microcomputer 130 includes a central processing unit (CPU) (i.e., not shown), which is the computational and control unit of microcomputer 130, and which interprets and executes instructions for cellular telephone 12.

Alternatively, cellular telephone transceiver 120 may be coupled to a single antenna 119 in place of antenna 20 and by way of high-pass filter 187, respectively High-pass filter 187 is utilized to filter only those signals which fall within a frequency range utilized by cellular telephones in the United States. High-pass filter 187 can be further modified to allow for cellular telephone frequency ranges of countries other than the United States. Specific design parameters of such a high-pass filter are left to the discretion of the manufacturer of a cellular telephone such as cellular telephone 12. Display 180 can be any type of display device which visually presents data to a cellular telephone user. Display devices such as a light-emitting diode panel or liquid crystal display can be utilized to implement display 180. Keypad 140 is a set of keys that are mounted on a small keyboard and are dedicated to a specific purpose, such as inserting numbers. Keypad 140 is preferably modeled on the standard telephone keypad.

Control signals 131 TX ENABLE and 132 RX ENABLE of microcomputer 130 enable cellular transmitter 124 and cellular receiver 122, respectively. In addition to control signals 131 and 132 to cellular transceiver 120, microcomputer 130 also monitors control signals 133 RSSI, 134, RX DATA, and 135 TX DATA for detecting signal strength, for detecting receive data and for sending transmit data, respectively, utilized in operation of cellular transceiver 120. In addition, audio circuitry 126 is coupled to audio switch 150 via RX AUDIO and TX AUDIO Signal lines. Audio circuitry 126 also receives signals from cellular receiver 122 and cellular transmitter 124. Cellular receiver 122, cellular transmitter 124 and audio circuitry 126 together compose cellular transceiver 120. Note that the example depicted in FIG. 2 merely describes one form of a cellular telephone that can be utilized in accordance with the method and system of the present invention. One skilled in the art will appreciate that other types of cellular telephone systems can be implemented with a preferred embodiment of the present invention, as long as the particular cellular telephone system utilized provides restricted user termination areas based on originator location.

Figure 3:
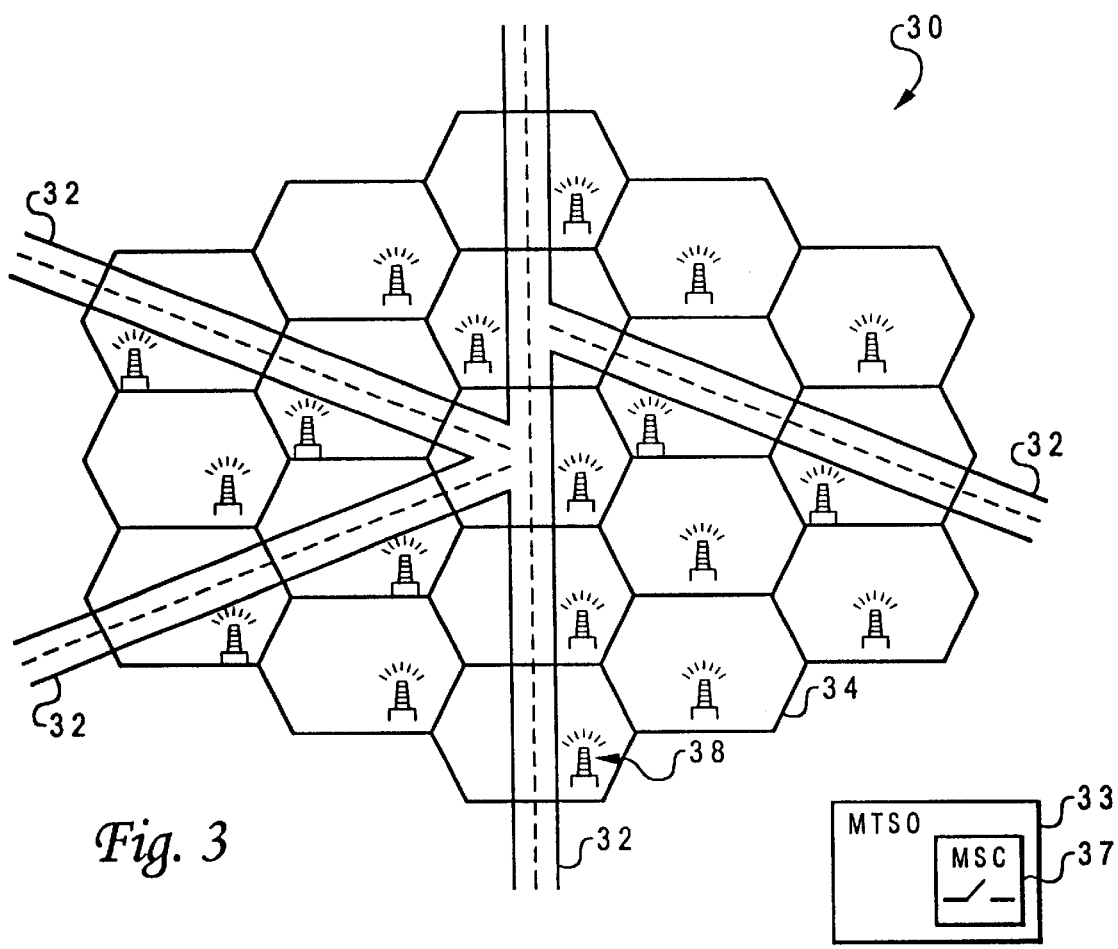
FIG. 3 illustrates a pictorial representation illustrative of a cellular telephone system in which a preferred embodiment of the present invention may be implemented.
Figure 4:
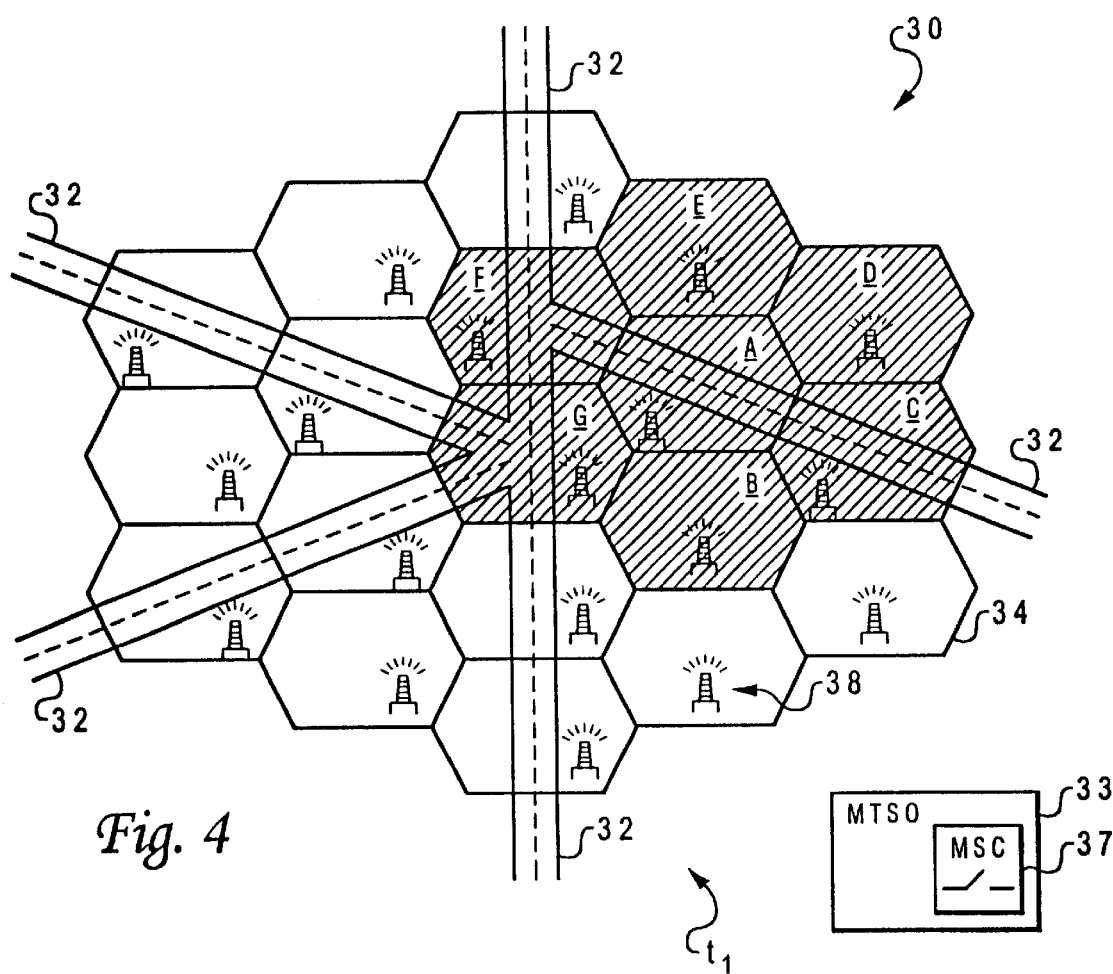
FIG. 4 is a pictorial diagram illustrative of a cellular telephone system at a first time period in accordance with a preferred embodiment of the present invention.
Figure 5:
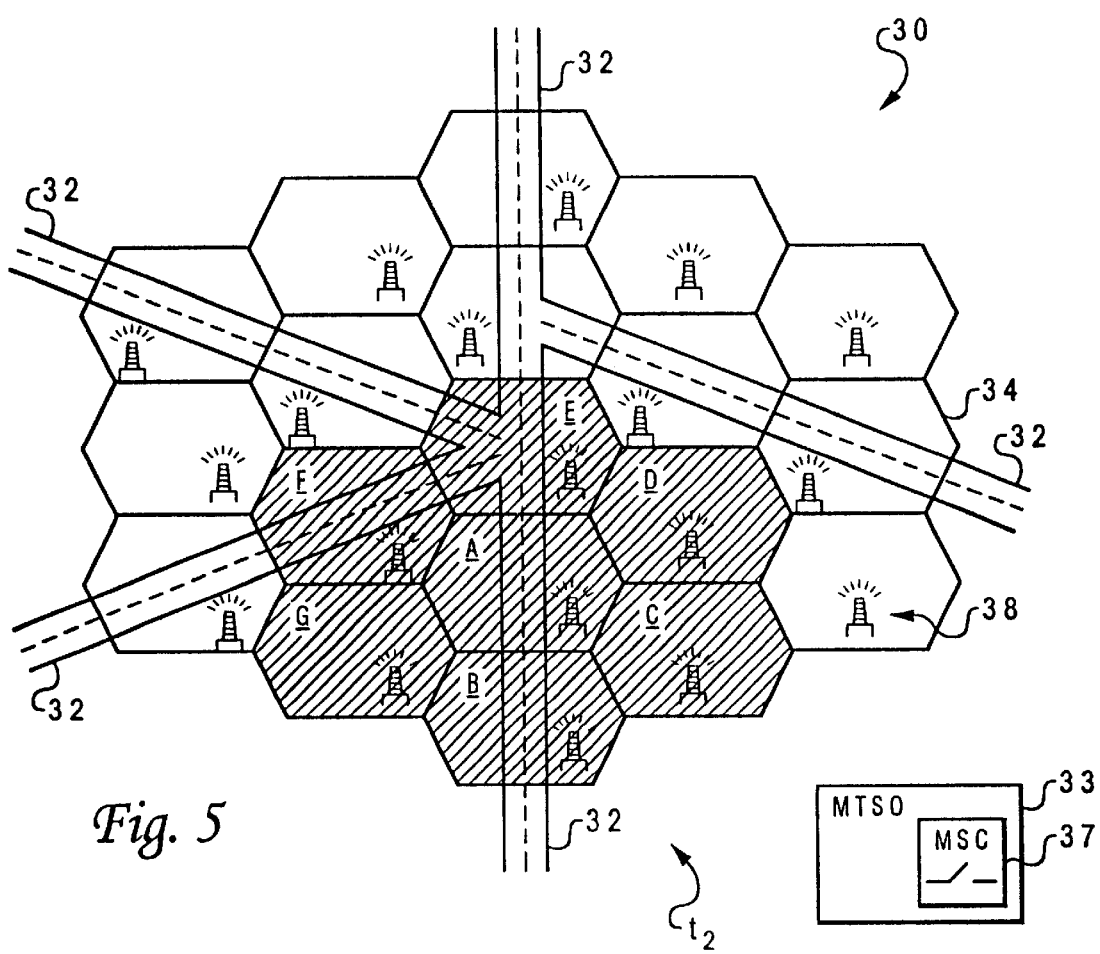
FIG. 5 is a pictorial diagram illustrative of a cellular telephone system at a second time period in accordance with a preferred embodiment of the present invention.

In FIG. 3, FIG. 4, and FIG. 5, like parts are indicated by like reference numerals. FIG. 3 depicts a pictorial representation illustrative of a cellular telephone system 30 in which a preferred embodiment of the present invention can be implemented. Cellular telephone system 30 is composed of a variety of cells 34. Each cell encompasses a specified geographic area. Each geographic area has its own base station 38 and a single controller (not shown) interconnected with a public telephone network. Each cell 34 sits adjacent another cell to create a honeycomb pattern of cells. Cells 34 can cover a large metropolitan area. Each cell 34 can have a radius of about 13 to 19 km (8 to 12 miles), depending upon the strength of each base station 38.

Specific cell radii are not necessary features of the present invention. Cells can have ranges as low as several hundred feet up to approximately 25 miles in radius. The specific numbers described herein are for demonstrative purposes only and are not necessary features of the present invention. Although not depicted in FIG. 3, each cell 34 can be further subdivided into still smaller cells. In this way, the honeycomb pattern of cells 34 can repeatedly utilize the same range of radio frequencies without interfering with one another, so long as neighboring cells 34 do not utilize precisely the same radio channels.

Although not shown in FIG. 3, each cell 34 can include six directional antennas, centrally located in each cell 34, each radiating into a sixty degree section of each cell. A plurality of cells 34 are combined to form cellular telephone system 30 covering a particular geographic area. This cellular system enables mobile cellular telephone traffic to communicate with landline telephone networks and other mobile cellular telephones while moving through the geographic area. Each cell 34 also has a number of frequencies, transmitted by low power transmitters, assigned to it that cannot be utilized in adjacent cells because of frequency interference problems. Due to the low power of each cell's transmitter, however, the same frequency can be re-utilized in other cells, referred to as co-channel cells in the same metropolitan area.

Cellular telephone system 30 is an example of a cellular mobile service, a communications service that allows a user to access the public telephone network from a stationary or moving vehicle, and which is based on a combination of radio transmission and telephone switching. Individuals with small mobile telephones can utilize this system in the same way that telephone calls are made utilizing standard carriers. The cellular mobile service thus provides a communication link to the user by segmenting a large geographic area into smaller areas (i.e., cells).

Cellular telephone system 30 can include cellular subscriber units which may be mobile or portable. Each base station 38 is connected to the public telephone company (i.e., TELCO) via one or more cellular switching network (not shown). Each cellular subscriber has an assigned cellular telephone number that allows the user to place and receive calls within a widespread range of each base station 38, such as throughout a metropolitan area. During a cellular telephone call, when a mobile cellular telephone moves from one cell to another, it must be handed-off to the next cell in order to continue communicating. This procedure is accomplished as follows for the analog cellular system. The cell serving the mobile cellular telephone and neighboring cell sites scans (i.e. takes samples of) the received mobile cellular telephone signal strength. This information is collected at a switch and a decision is made whether to hand-off the mobile cellular telephone call to a neighboring cell.

For the U.S. Digital Cellular System, as outlined in the Electronic Industries Association/Telecommunications Industry Association (EIA/TIA) Standard IS-54 document, the mobile cellular telephone also collects channel quality information (channel bit error rate (BER) and signal strength) on its own channel and signal strength measurements on neighboring cell channels. This information is transmitted to the serving cell site as a mobile assisted hand-off (MAHO) message to be added to the base scan information for making a hand-off decision. Such hand-off procedures can be utilized with the cellular telephone system described herein; however, such hand-off procedures are not necessary features of the present invention only and are merely included to describe one particular embodiment of the present invention.

A street or road 32, such as a metropolitan highway, is depicted as extending through cells 34 contained within cellular telephone system 30. Thus, a user can travel along road 32 through cells 34 and while travelling, perform cellular mobile telephone operations. Cellular telephone system 30 further includes a mobile telephone switching office (MTSO) 33, a central office for mobile switching in cellular telephone system 30. MTSO 33 houses a mobile switching center (MSC) 37, and fielded monitoring and relay stations (not shown) for switching calls from cell sites to wire line central offices such as (TELCO) 14 depicted in FIG. 1, or a public switched telephone network (PSTN), made up of local networks, exchange area networks, and long-haul networks that interconnect telephones and other communication devices on a worldwide basis. MSC 37 can control system operations in analog cellular networks. For example, MSC 37 can control calls, track billing information, and locate cellular subscribers. MSC 37 is thus a switch that provides services and coordination between mobile cellular telephone users in a network such as cellular telephone system 30 and external networks.

FIG. 4 is a pictorial diagram illustrative of a cellular telephone system 30 at a first time period $t_1$ in accordance with a preferred embodiment of the present invention. In FIG. 4, shaded cells together form a region surrounding the terminator. Note that as utilized herein, the term "terminator" is not necessarily synonymous with a terminating user. Rather, the term "terminator" can refer to the mobile cellular telephone in which a cellular telephone call terminates (i.e., the telephone to which the call is routed). The term "terminating user" refers properly to a user of a mobile cellular telephone in which a cellular telephone call terminates. In determining the geographic location of a terminating user, however, assuming the terminating user is utilizing a terminating cellular telephone phone to field a mobile cellular telephone call, the geographic location of the terminating user is approximately equivalent to the determined geographic location of the terminating cellular telephone. In such an instance, a determination of the geographic location of the "terminator" refers to either the geographic location of the terminating user or the terminating cellular telephone because in essence, the geographic locations are one in the same (e.g., a terminating user holding a mobile cellular telephone in hand to receive a phone call).

In the example depicted in FIG. 4, The terminator is located in cell A at time $t_1$. According to a preferred embodiment of the present invention, the geographic location of an originator is utilized in combination with the geographic location of the terminator to determine the appropriate cellular telephone service. Because the terminator is always located in cell A, a general geographic region always surrounds and includes cell A. This region is composed of cells A, B, C, D, E, and F. This region is based on the terminator's service.

For example, if a terminator (e.g., a plumber) wishes to receive calls from an originator, when physically located close to the originator (e.g., an individual needing a plumbing repair), the originating call will be processed. In such a case, it can be assumed that the terminator is located in one of cells A, B, C, D, E or F. However, if the originator is not located in any of cells A, B, C, D, E, or F, the originating call will be automatically transferred to a central dispatcher. The originator is notified by the dispatcher, which may be no more than a recorded message, that the telephone call cannot be processed, and that the originator should attempt to communicate with the terminator at a later time. In the aforementioned "plumber" example, other options can be implemented. For example, the dispatcher may determine another plumber who is closer to the originator and inform the originator of this information, or set an appointment for a later time.

Note that as utilized herein, the term "originator" is not necessarily synonymous with a human operator. An originator can be a human operator or an electrical device such as a computer. The term "originator" can refer to a device from which a cellular telephone call originates (i.e. a mobile cellular telephone). Thus, assuming the human operator and the mobile cellular telephone are located close to one another, a determination of the geographic location of the mobile cellular telephone also leads to a determination of the geographic location of the human operator. If a mobile cellular telephone phone receives commands to initiate a mobile cellular telephone call via transmission media such as a radio network from a human operator located a long distance away from the mobile cellular telephone, then a determination of the geographic location of the mobile cellular telephone does not necessarily lead to an accurate determination of the geographic location of the human operator. Those skilled in the art, however, will appreciate that as currently practiced, cellular subscribers (i.e. human operators) utilize mobile cellular telephones when located near the mobile cellular telephone (e.g., punching keys on a mobile cellular telephone and placing the mobile cellular telephone near his or her mouth and ear to make a call). Thus, a determination of the geographic location of the mobile cellular telephone generally leads to a determination of the geographic location of the mobile cellular telephone user. In such instances, the term "originator" can more appropriately refer to a human operator who initiates a mobile cellular telephone call by simply pressing keys on a mobile cellular telephone.

Thus, according to a preferred embodiment of the present invention, the geographic location of the originator is determined, along with the geographic location of the terminator. If the originator and the terminator are located close enough to one another, the terminator can receive the call from the originator. Thus, the geographic distance between the terminator and the originator can be utilized to trigger a course of action in which either the call is allowed to go through to the terminator, or alternative action is taken, such as playing a message announcement for the originator, or transferring the call to a dispatcher.

Of course, one skilled in the art will appreciate that the aforementioned trigger is not the only trigger that can be utilized in accordance with a preferred embodiment of the present invention For example, a preferred embodiment of the present invention can be implemented in which, if the originator and the terminator are located in the same city, zip code, neighborhood, county or service area, the terminating user will then receive the call from the originator. Likewise, if the originator is located less than X driving time from the terminator (e.g. based on road type and driving distance), the terminator can also receive the call from the originator.

The opposite is also true. The terminator may wish to accept the call when the originator is located farther than a set area. In such a case, the terminator will receive calls from originators who are located outside the specified area rather than inside the area. Additional triggers than can be utilized in accordance with a preferred embodiment of the present invention may include "time-of-day" and "day-of-week" triggers. For example, the services provided in an implemented preferred embodiment may be appropriate during the day, but not at night. In addition, an associated trigger can include the number dialed. For example, a terminator may only wish to include this service for a business number that terminates at a mobile communications device such as mobile cellular telephone, but not for a personal number that also terminates at the same mobile cellular telephone. In addition, an associated trigger can be based on calling line identification (i.e., CLID). For example, an individual may only want this service for general phone calls, but not for a particular individual.

FIG. 5 is a pictorial diagram illustrative of cellular telephone system 30 at a second time period $t_2$ in accordance with a preferred embodiment of the present invention. In the embodiment depicted in FIG. 5, cell A and its associated region composed of adjacent cells B, C, D, E, F, and G has shifted, meaning the terminator, located previously in cell A, is located at a different location within cellular telephone system 30. Cell A can thus be described as a termination area, an area in which a terminator is located. FIG. 4, together with FIG. 5, demonstrate the movement of a terminator through a particular geographic area. Thus, cell A designates the cell that the terminator is currently located in at any point time. According to a preferred embodiment of the present invention, restricted termination areas are provided in which certain calls from originators to the terminator are allowed to be processed or not according to restriction parameters.

Again, if an originator is located within the region composed of cells A, B, C, D, E, and F, and desires to contact the terminator, the call is processed based on the fact that the originator and the terminator are located close to one another (i.e., within the same region). However, the call will not be processed, and alternative action will be taken if the originator is located outside of the region composed of cells, A, B, C, D, E, and F. Of course, it can be appreciated by those skilled in the art that the number of cells which make up a given region as described herein is not a necessary feature of the present invention and is shown for illustrative purposes only.

Figure 6:
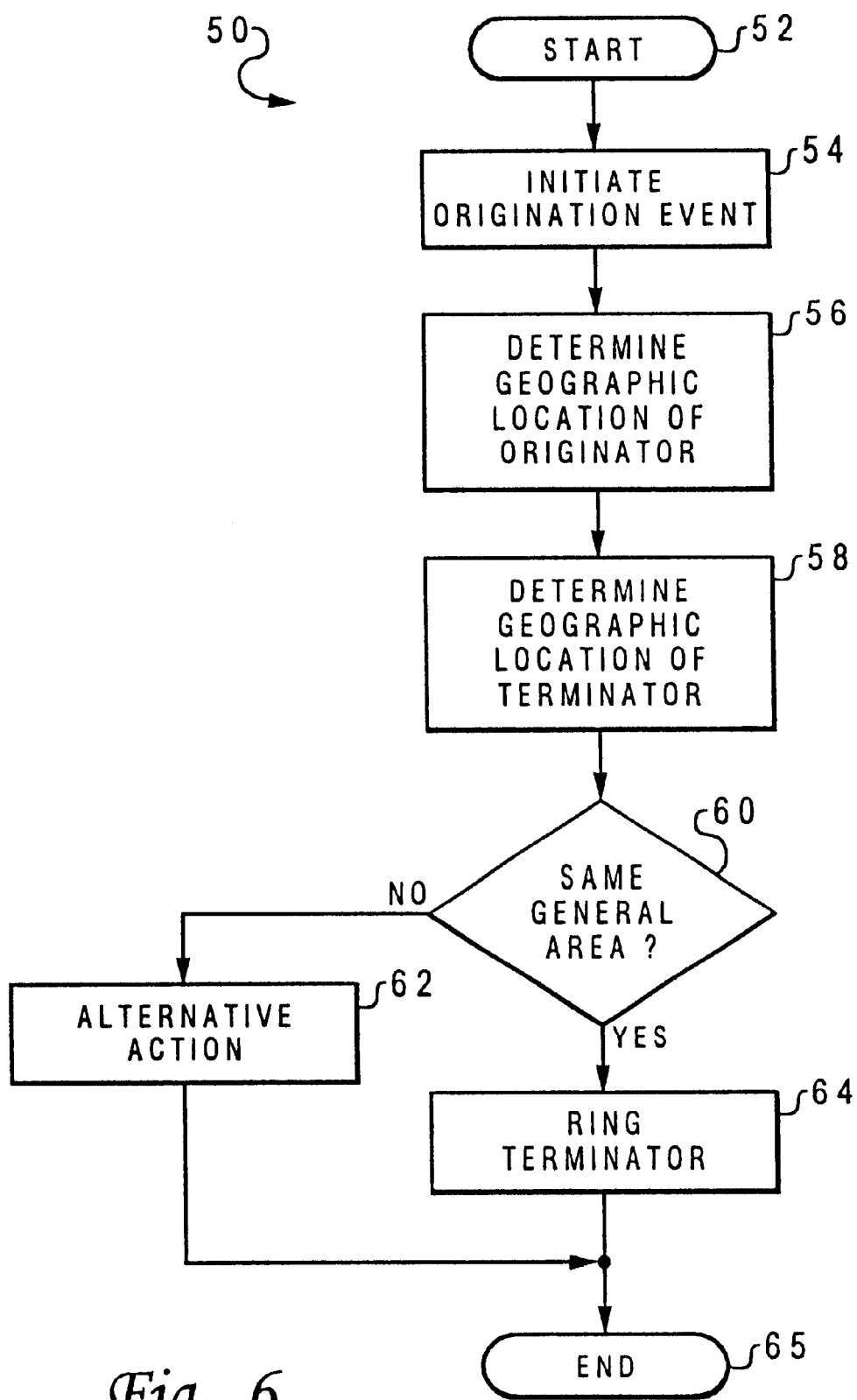
FIG. 6 illustrates a high-level flow chart of operations illustrative of a method in a cellular telephone network for providing restricted user termination areas based on the location of an originator and a terminator, in accordance with a preferred embodiment of the present invention.

FIG. 6 illustrates a high-level flow chart of operations 50 illustrative of a method in a cellular telephone network for providing restricted user termination areas based on the location of an originator and a terminator, in accordance with a preferred embodiment of the present invention. It can be appreciated by those skilled in the art that FIG. 6 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind.

The present invention relates to method steps for processing electrical or other (e.g. mechanical, chemical) physical signals to generate other desired physical signals, and can be implemented via a computer such as microcomputer 130. However, it is not necessary to maintain within a computer memory of a cellular telephone, instructions implementing these method steps. Such instructions can be maintained with a computer memory at a cellular telephone base station or a central broadcasting center from which such base stations receive instructions. Implementation of the method described herein is left to the discretion of a particular cellular telephone system designer.

Thus, as illustrated at block 52, the process for implementing the present invention begins. As described at block 54, an origination event occurs. An "event," in the context of the method described herein, is an occurrence or happening, usually significant to the performance of a function, operation, or task. An origination event is an event in which an originator triggers a cellular communications telephone call. The originator is an initiator of a particular information transfer transaction. In the case of cellular telephone system, such an initiation of a particular information transfer transaction occurs as the result of an originator pressing telephone keys on a cellular telephone keypad. Initiating such a communication transaction can also include initiation of a calling line identification (CLID) service in which the location of an originating landline is determined in order to transfer the identity of the caller to a terminator. CLID is a feature of many wireless communication networks in which a call receiver (i.e. the terminator) is notified by the network of the number (i.e., or address) from which the call originated.

As depicted at block 56, the geographic location of the originator (i.e. originator) during the origination event is determined. Any number of geographic locator methods can be utilized to perform this operation. For example, the latitude and longitude of the originator can be utilized to determine the geographic location of the originator. The Global Positioning Satellite (GPS) system can be utilized to calculate the latitude and longitude of the originator. Other techniques, such as signal strength triangulation can be utilized to determined the geographic location of the originator. As described at block 58, the geographic location of the terminator (i.e. also can be referred to as a "terminator") is determined.

As illustrated at block 60, a test is performed to determine whether or not the location of the originator is in the same general area as that of the terminator. The size of the general area can be limited to one cell, several cells or a city. The size of the area is dependent on an ability to determine the location of the originator with respect to the terminator. One skilled in the art will appreciate that cells are not the only units of granularity that can be utilized to implement a preferred embodiment of the present invention. The present invention, as described herein, can support a much smaller area of choice than a cell.

For example, if a terminator desires to accept only those calls from originators who are located five minutes away or less, a cell is too large an area to utilize for determining the distances between originators and terminators. Also, for example, if a terminator wishes to receive calls from among the closest of five units (e.g. five police officers attempting to respond to an emergency), the cell itself is too large of an area to be utilized to determine with any reasonable accuracy the closest mobile cellular telephone. Thus, the size of the general area can be smaller than a cell, the size of a single cell, or include several or many cells. The size of the general area depends only upon a desired implementation of the present invention.

If it is determined that the originator is not in the same general area as the terminator, then as described at block 60, alternative action is taken. Such actions can include the implementation of a communication with a human dispatcher located at a central location within the cellular telephone network in which the invention is implemented, or a pre-recorded announcement advising the originator to try again later or leave a recorded message for the terminator to retrieve later. If, however, it is determined that the originator is located in the same general area as the terminator, then the call is processed and as illustrated at block 64, the call will go through to the terminator. As depicted at block 65, the process described in FIG. 6 ends.

It can be appreciated by one skilled in the art that the methods or processes described herein can be implemented as a program product, such as a control program residing with a computer memory and containing instructions that when executed on a CPU, will carry out the operations depicted in the logic flow charts described herein. It is important to note that, while the present invention can be described in the context of a fully functional computer system, those skilled in the art can appreciate that the present invention is capable of being distributed as a program product in a variety of forms, and that the present invention applies equally, regardless of the particular type of signal-bearing media utilized to actually carry out the distribution. Examples of signal-bearing media include: recordable-type media, such as floppy disks, hard-disk drives and CD ROMs, and transmission-type media, such as digital and analog communication links.

Figure 7:
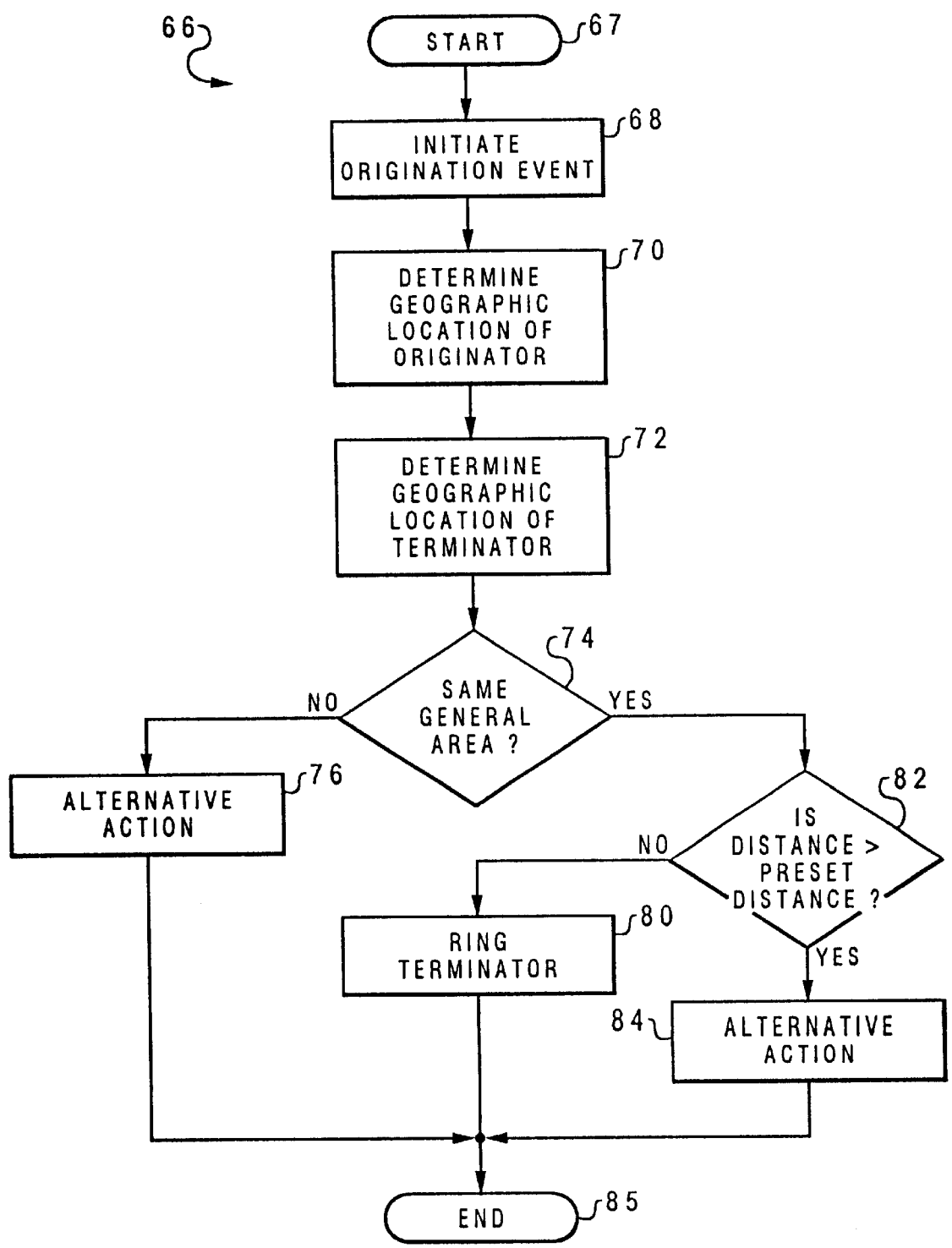
FIG. 7 illustrates a detailed flow chart of operations illustrative of a method in a cellular telephone network for providing restricted user termination areas based on the location of an originator and a terminator, in accordance with a preferred embodiment of the present invention.

FIG. 7 illustrates a detailed flow chart of operations 66 illustrative of a method in a cellular telephone network for providing restricted user termination areas based on the location of an originator and a terminator, in accordance with a preferred embodiment of the present invention. As illustrated at block 67, the process for implementing the present invention begins. As described at block 68, an origination event occurs in which an originator triggers a cellular communications telephone call.

As depicted at block 70, the geographic location of the originator (i.e. originator) during the origination event is determined. Any number of geographic locator methods can be utilized to perform this operation. For example, the latitude and longitude of the originator can be utilized to determine the geographic location of the originator. The Global Positioning Satellite (GPS) system can be utilized to calculate the latitude and longitude of the originator. Other techniques, such as signal strength triangulation, can be utilized to determined the geographic location of the originator. As described at block 72, the geographic location of the terminator is determined.

As illustrated at block 74, a test is performed to determine whether or not the location of the originator is in the same general area as that of the terminator. The size of the general area depends upon the range and strength of a cellular telephone network in which a preferred embodiment of the present invention is implemented. For example, the size of the general area can be limited to just one cell or several cells. If it is determined that the originator is not in the same area as the terminator, then as described at block 76, alternative action is taken. Examples of alternative action that can be performed include routing the call to a human dispatcher located at a central location within the cellular telephone network in which the invention is implemented, or playing a pre-recorded announcement advising the originating user to try again later or leave a recorded message for the terminating user to retrieve later.

If, however, it is determined that the originator is located in the same general area as the terminator, then an additional test is performed, as indicated at block 82, to determine if the originator is located a distance greater Man a preset distance from the terminator. For example, it may be desirable in an implementation of a preferred embodiment of the present invention to designate a preset distance of three miles. Given these parameters, if the originator is located four miles away from the terminator, the originator is located a distance greater than the present distance of three miles. If it is determined that the originator is located at a location greater than the preset distance, then as described at block 80, the call is routed directly to the terminator. The process thereafter ends, as depicted at block 85. If, however, it is determined that the originator is not located a distance greater than the preset distance, then as illustrated at block 84, alternative action is taken (e.g. routing the call to a dispatcher, voice messaging services, and so forth). Note that the general area, as described at block 74, can be implemented within the boundaries of a cell, or can be greater than the size of a cell. Implementing the general area as a cell takes advantage of existing cellular phone systems. However, the general area can be greater than the size of a cell, depending upon the desires and needs of individuals implementing a preferred embodiment of the present invention.

Figure 8:
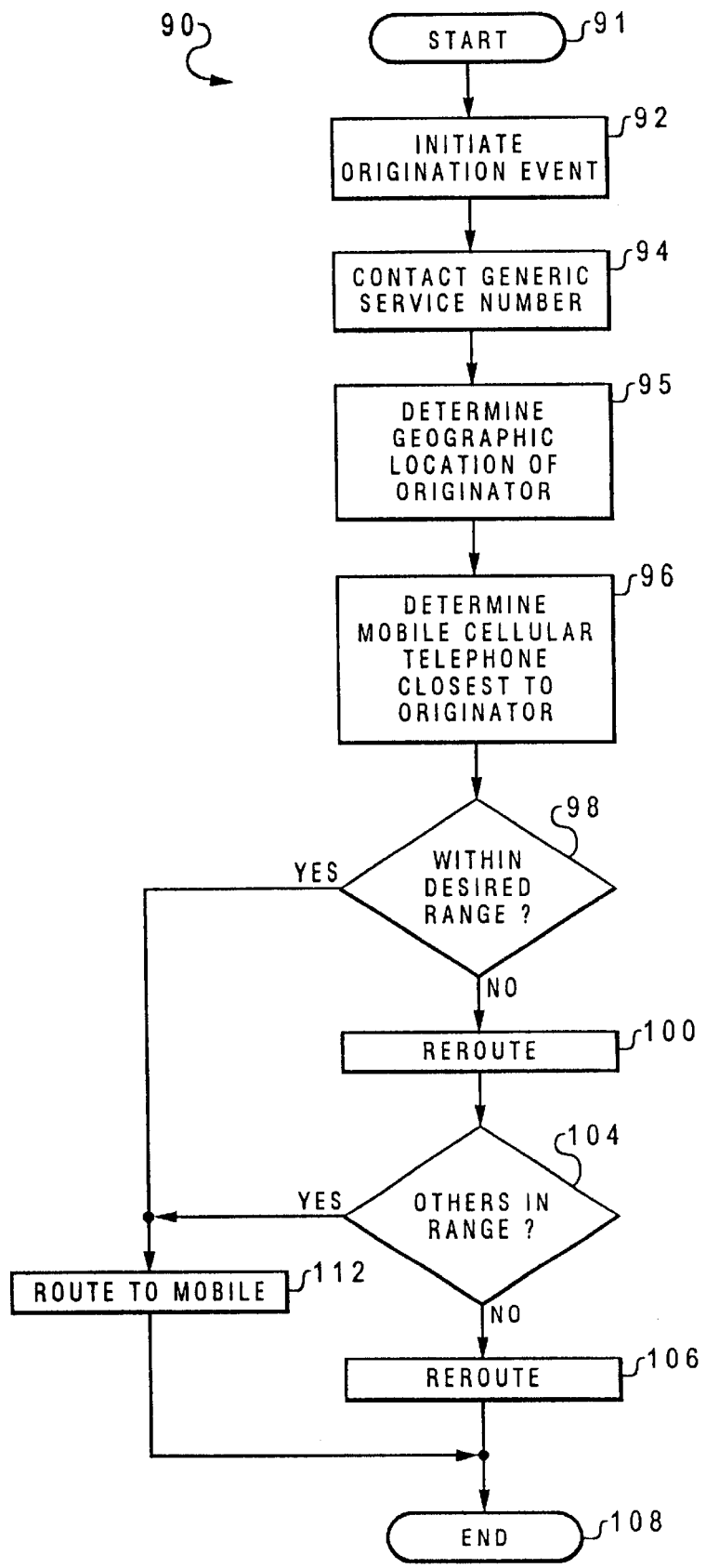
FIG. 8 illustrates a flow chart of operations illustrative of a method in a cellular telephone network for triggering communication transactions between originators and terminators depending upon the proximity of the originators and terminators to one another.

FIG. 8 illustrates a flow chart of operations 90 illustrative of a method in a cellular telephone network for triggering communication transactions between originators and terminators depending upon the proximity of the originators and terminators to one another. The process begins, as depicted at block 91. As illustrated at block 92, an origination event is initiated. Such an event can be initiated when an originator dials a telephone number. As described at block 94, the originator contacts a generic service telephone number. As described at block 95, the geographic location of the originator is located according to one of the geographic location techniques described herein. As depicted at block 96, the service determines which of several mobile cellular telephones is closest to the originator.

As illustrated at block 98, a decision is made to determine whether or not one of the mobile cellular telephones is located close enough to the originator to justify completion of the initiated communications transaction (e.g., a call). If one of the mobile cellular telephones is located close enough to the originator to justify completion of the initiated communications transaction, then as depicted at block 112, the call is routed directly to that particular mobile cellular telephone and the process ends, as described at block 108. If none of the mobile cellular telephones (i.e. terminators) are close enough, then as depicted at block 100, the call can be rerouted to a secretary, dispatcher, voice mail, etc.

As illustrated at block 104, another decision is made determining whether or not other mobile cellular telephones among a list of mobile cellular telephones (i.e. terminators) is within range. If the answer is yes, then as depicted at block 112, the call is routed to a mobile cellular telephone within range of the originator, and the process ends, as described at block 108. If, however, none of the mobile cellular telephones on that list are within range, then as depicted at block 106, the call is rerouted to a secretary, dispatcher, voice mail, etc. The process finally ends, as illustrated at block 108.

A preferred embodiment of the present invention can essentially be broken down into seven parts: subscription, collecting the geographic location of the originator, delivering the location of the originator, collecting the geographic location of the terminator, delivering the geographic location of the terminator, determining an appropriate action, and executing the appropriate action. These parts, taken together, provide a service for routing calls from originator to terminators based on the geographic location of the originator in association with the geographic location of the terminator.

Figure 9:
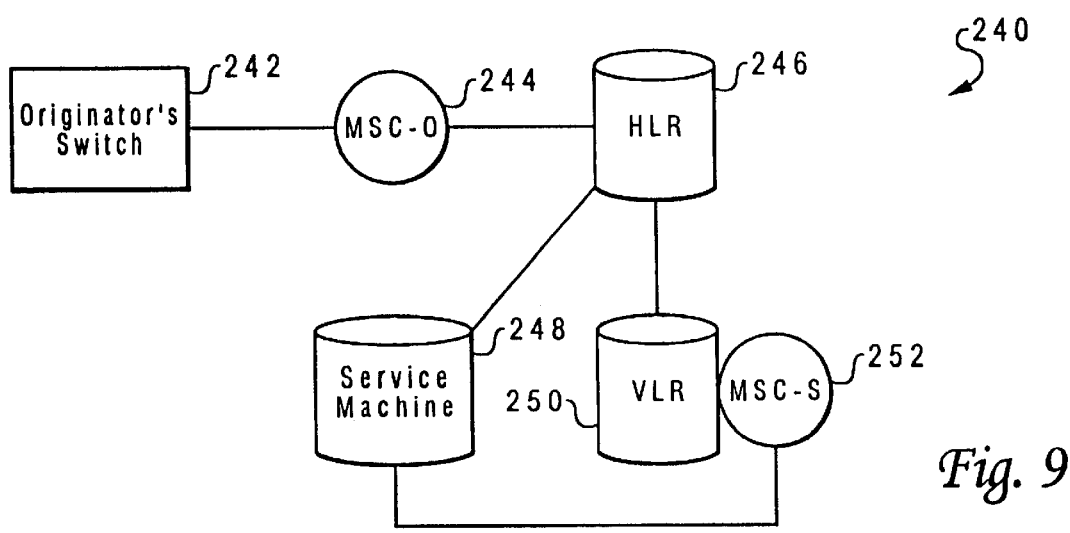
FIG. 9 depicts a block diagram illustrative of a mobile switching center, service machine, and originator's switch in a cellular telephone system in which a preferred embodiment of the present invention may be implemented.

FIG. 9 depicts a block diagram 240 illustrative of an originator's switch 242 interconnected with a service machine 248 in a cellular telephone system in accordance with a preferred embodiment of the present invention. The originator's switch 242 is coupled to an originating mobile switching center (MSC-O) 244. MSC-O 244 is the mobile switching center in a cellular network that contains information indicating that an incoming call is destined for a mobile cellular telephone. MSC-O 244 is coupled to home location register (HLR) 246. HLR 246 is the location register to which a user identity may be assigned for record purposes, such as subscriber information (e.g. serial number, mobile station directory number, profile information, current location, authorization period, etc).

HLR 246 may or may not be located within and be distinguishable from a mobile switching center (MSC). HLR 246 may serve more than one MSC. In general, an HLR such as HLR 246 can be distributed over more than one physical entity. HLR 246 is coupled to service machine 248 which in turn is connected to the serving mobile switching center (MSC-S) 252. MSC-S 252 is the mobile switching center that currently has a mobile cellular telephone subscriber located at a mobile switching center cell site within a coverage area of the mobile switching center. MSC-S 252 in turn informs visiting location register (VLR) 250 that the mobile cellular telephone is located at the cell sites within the coverage area. VLR 250 is a location register other than HLR that is utilized by an MSC to retrieve information for handling of calls to or from a visiting subscriber. VLR 250 may or may not be located within and be indistinguishable from an MSC. VLR 250 may serve more than one MSC.

Originator's switch 242, which can be a wireless or wireline switch well known in the art of communication transactions, is responsible for providing information that identifies the mobile cellular telephone geographic location (e.g., which may be only a calling line ID for wireline users). MSC-O 244 (i.e., originating MSC) is responsible for determining that this call is destined for a wireless directory number, and passes the location information to HLR 246. HLR 246 is responsible for providing the subscription information, for querying service machine 248 for instructions, and for requesting that VLR 250 in association with MSC-S 252 provide the geographic location of the mobile cellular telephone. VLR 250 and MSC-S 252 are responsible for providing the location of terminators. Service machine 248 is responsible for providing appropriate action following the aforementioned requesting and querying operations.

In a preferred embodiment of the present invention, a subscription is that portion of the service that provides to the various entities involved, necessary information regarding which mobile subscribers (MS) have subscribed to the service. HLR 246, VLR 250 and service machine 248 are involved in the subscription portion of the service. HLR 246 is responsible for service provisioning the subscription service. This means that HLR 246 provides an external interface that provides an HLR operator with the capability of specifying which mobile switches will be provided with the subscription service and which mobile switches will not. Information specifying subscription includes the address of service machine 248.

Service machine 248 is responsible for determining the subscription information for mobile switches. This may be accomplished by fetching the profile from HLR 246, or it can be accomplished by providing an external interface which service machine 248 can utilize to designate which mobile switches will be provided with the subscription service. Service machine 248 is responsible for maintaining and processing methods for determining whether or not to allow a call to complete. Examples of such methods include those depicted in FIG. 6, FIG. 7 and FIG. 8 herein. Tests utilized to determine whether or not to complete a call include determining a distance from a terminator. This can include determining whether a particular mobile cellular telephone is located within or beyond this distance. Other tests include determining whether or not an originator is located in the same area (e.g., city, county, neighborhood, etc.) as the terminator, or determining only certain parties falling within or outside a particular distance from a terminator may be allowed to process a call to the terminator. In addition, another test that can be utilized to determine whether or not to complete a call from an originator, includes determining whether or not the subscription service is allowed to operate only for particular directory numbers. An example of an additional test that can be utilized in accordance with a preferred embodiment of the present invention includes a situation in which a business number is allowed to utilize the service described herein, but a personal number is not.

Additional examples of tests that may be utilized in accordance with a preferred embodiment of the present invention to determine whether or not an initiated communication transaction should be completed, include determining the time-of-day or day-of-week in which the call is being made. For example, in some geographic locations, it may be desirable for terminating users not to receive calls at certain times (e.g., weekday afternoons). Such time parameters can thus be implemented in accordance with a preferred embodiment of the present invention to screen calls from originators. Such time parameter determinations are made via the service node.

CLID can be utilized in accordance with the present invention to determine if restricting a termination area (i.e., the area in which the call terminates) as described herein is appropriate for a particular originator. As described herein, CLID is an existing service that provides a terminating user with information related to the identity of a caller (e.g., the caller's telephone number, address, etc). CLID can be utilized to indicate whether or not to invoke the methods and system described herein for a particular originator. For example, a spouse may desire that restricted termination areas not be invoked if his or her wife or husband calls. However, if another person (e.g., a customer) initiates a communications transaction to the spouse (i.e., terminator), the methods and system described herein are invoked and processed. CLID thus identifies the particular caller (i.e, originator). Once identified, depending upon the identity of the caller, restricted termination areas as described herein can be provided.

Figure 10:
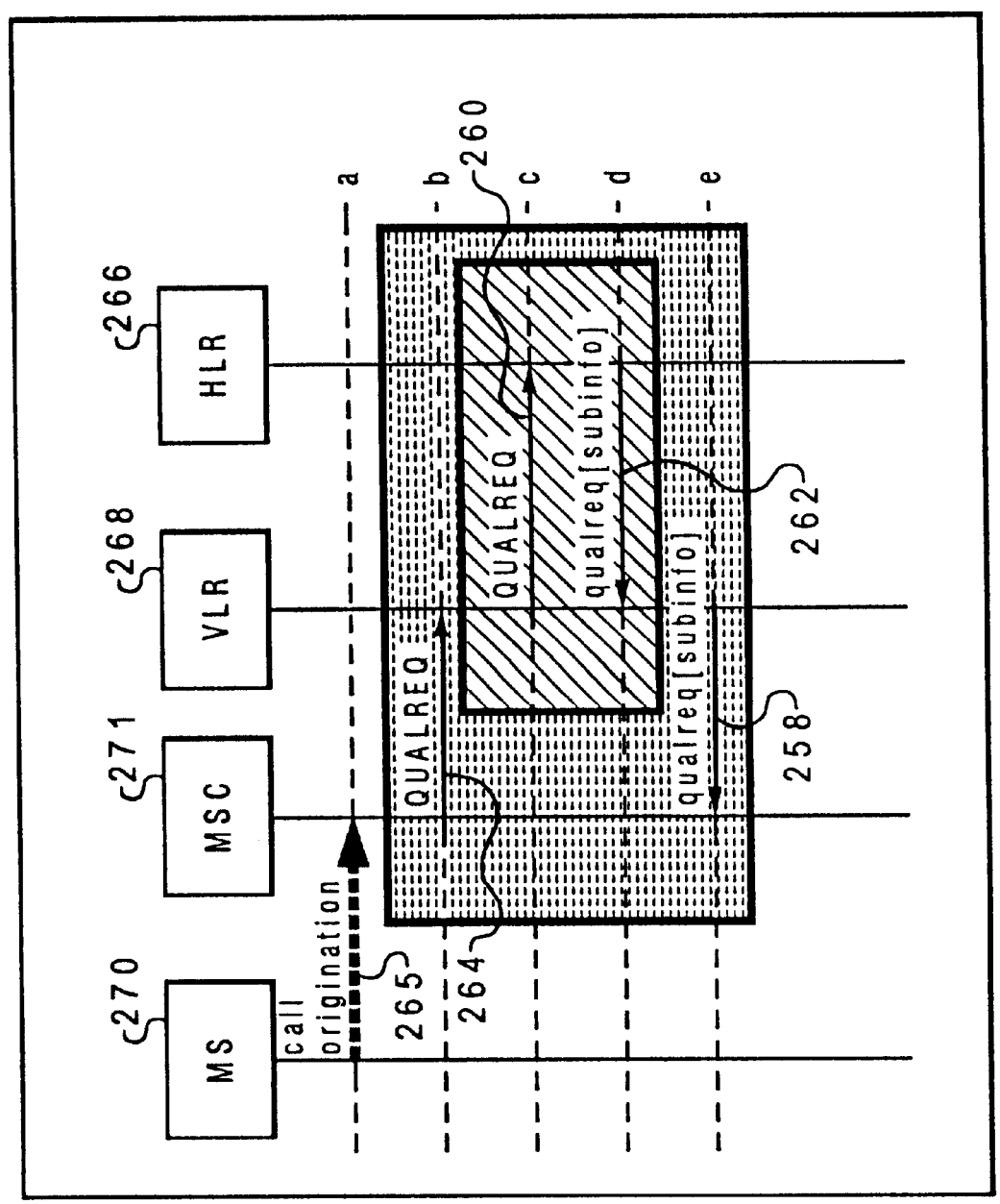
FIG. 10 illustrates a message flow diagram of mobile station (MS) call originators in accordance with a preferred embodiment of the present invention.

FIG. 10 illustrates a message flow diagram 256 of mobile station (MS) call originators in accordance with a preferred embodiment of the present invention. An MS comprises interface equipment utilized to terminate the radio path at the user side. It provides the capabilities to access network services by a user. According to message flow diagram 256, at step a, call origination as indicated by arrow 265, occurs. MSC 271 (i.e., the serving MSC) receives a call origination from MS 270. Note that MSC 271 is analogous to MSC-S 252 of FIG. 9. As indicated at step b, if the profile of the MS is unknown to the MSC, a "QUALREQ" is sent to VLR 268, as indicated by arrow 264. Note that messages in all caps (e.g. "ORREQ") are invoke messages requesting that something be done.

Messages in all lower case (e.g. "orreq") are return results (i.e., responses), giving the data requested or information related to what happened as a result of the request. As indicated at step c, if the profile of MS is unknown to VLR 268, then VLR 268 sends a "QUALREQ," as indicated by arrow 260, to HLR 266. Note that VLR 268 is analogous to VLR 250 of FIG. 9. As indicated at step d, HLR 266 sends a "qualreq" to VLR 268 (i.e., the serving MSC's VLR), as indicated by arrow 262. The subscription information for the new service is included in this request. As indicated at step e, the VLR stores the subscription information and sends back the "qualreq" to MSC 271, as indicated by arrow 258. In FIG. 10, HLR 266 is analogous to HLR 246 of FIG. 9.

In collecting the geographic location of the originator, only the originating switch is involved. If the originator is a landline and the directory number of the landline is available, and the directory number is sufficient to identify the location (i.e. the directory number is tied to a physical location), then the directory number provided in the calling line ID is sufficient to identify the location. If the originator is a wireless terminal or otherwise does not fit into the category mentioned above, the originating switch is responsible for determining the location of the originator. For a mobile cellular telephone, the originating switch can determine the geographic location of the originator in a variety of ways, including triangulation, directional antennae, and so forth, as discussed herein.

In delivering the geographic location of the originator, the originator's location information is provided to the service machine. The originating switch, MSC-O, the HLR, and the service machine are involved in this portion of the service. The originating switch is responsible for passing the information to the MSC-O. As indicated herein, this can be accomplished utilizing a calling line ID (i.e. when the calling line ID is associated with a fixed physical location). The information can also be geographic in nature, such as information that includes a longitude and a latitude. The MSC-O is responsible for determining that this particular termination is to a wireless directory number.

After determining that termination is to a wireless directory number, the MSC-O is responsible for querying the HLR for information on how to handle this particular termination. The MSC-O then passes the originator's location information along as part of this query. Upon reception of the query, the HLR is responsible for determining that this particular mobile cellular telephone has this service. For those mobile cellular telephones that include this service, the HLR queries the service machine, passing the location information along, and requesting instructions on how to proceed with the call. The service machine accepts the location of the originator and utilizes this information.

Figure 11:
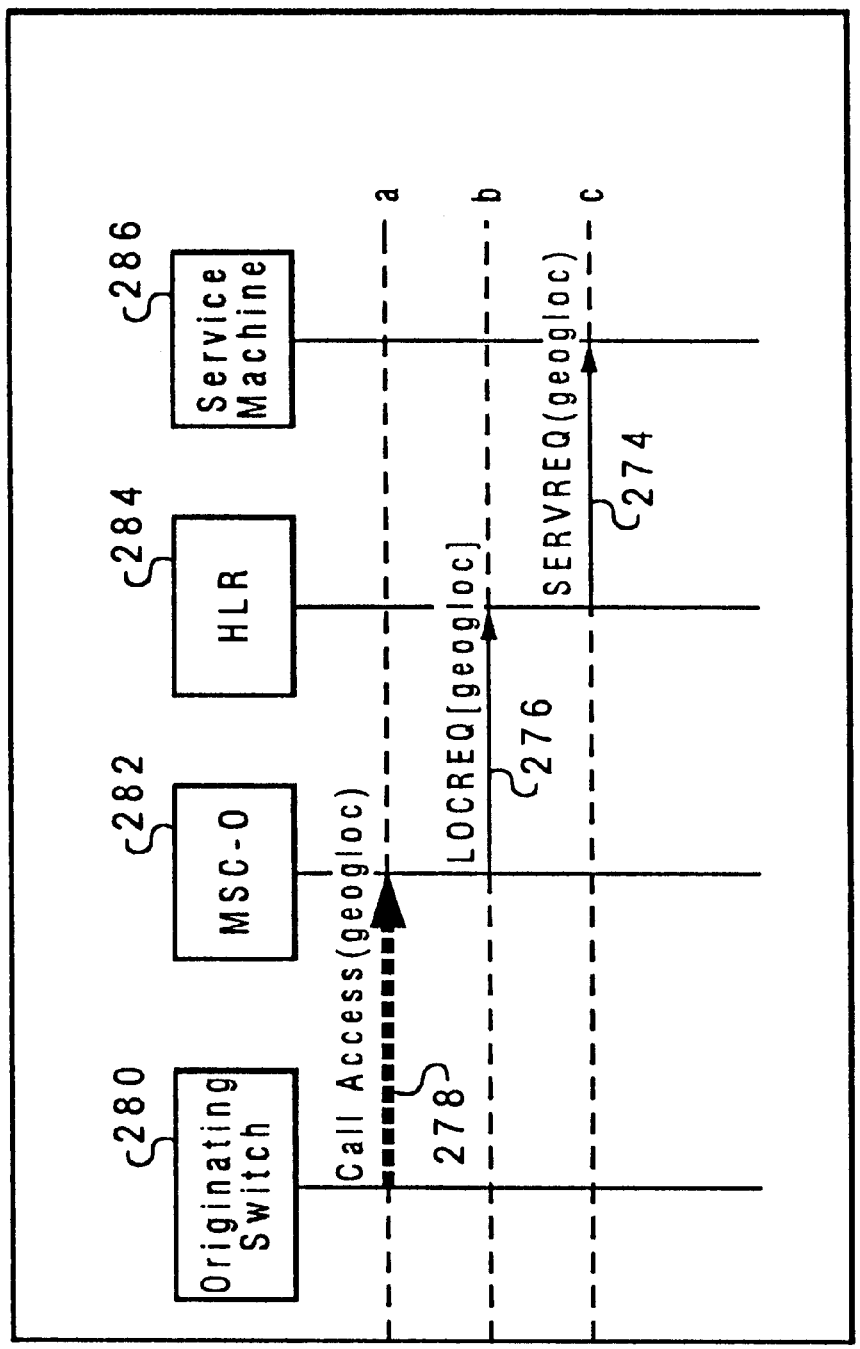
FIG. 11 depicts a message flow diagram of the flow for delivering the originator's location information in accordance with a preferred embodiment of the present invention.

FIG. 11 depicts a message flow diagram 272 of the flow for delivering the originator's location information in accordance with a preferred embodiment of the present invention. In the example depicted in FIG. 11, none of the messages are new. The geographic location information is added to existing messages. FIG. 11 includes an originating switch 280, an MSC-O 282, an HLR 284, and a service machine 286. As indicated at step a, as part of routing a call, the originating switch 280 passes appropriate information to identify the location of the originator. This information can be the originator's number (i.e., if the number is dedicated to a fixed location) and can include longitude and latitude information. This call access is indicated by arrow 278.

The phrase "geoloc" as utilized in the example of FIG. 11 is indicative of geographic location information. As indicated at step b, MSC-O 282 determines whether or not this call is intended for a mobile cellular telephone. MSC-O 282 sends a location request ("LOCREQ"), as indicated by arrow 276, asking for instructions. MSC-O 282 includes the geographic location of the originator in the message. As indicated at step c, HLR 284 notes that the mobile cellular telephone has subscribed to the service and the service machine 286 must be queried for instructions on how to handle this particular call. Querying of such instructions is indicated by arrow 274.

HLR 284 sends a service request ("SERVREQ") to service machine 286 and includes information specifying the location of the originator (i.e., "geoloc"). Note that the messages mentioned above are not independent of subsequent messages. That is, the messages always have responses, although such responses are not shown in the example depicted in FIG. 11. Note also that service machine 286 is analogous to service machine 248 depicted in FIG. 9. In addition, originating switch 280 is analogous to originator's switch 242 depicted in FIG. 9. Further, MSC-O 282 is analogous to MSC-O 244 depicted in FIG. 9. Additionally, HLR 284 is analogous to HLR 246 depicted in FIG. 9.

In collecting the geographic location of the terminator, only the MSC-S (i.e. serving MSC) is involved in this portion of the service. The serving switch (i.e. the terminator's switch) can determine the geographic location in a variety of ways, including triangulation, directional antennae, and so forth. It is left to the discretion of a user how best to determine the location of the originator. Delivering the geographic location of the terminator is that part of the service in which the terminator information is delivered to the service machine. There are several techniques for implementing this portion of the service.

Figure 12:
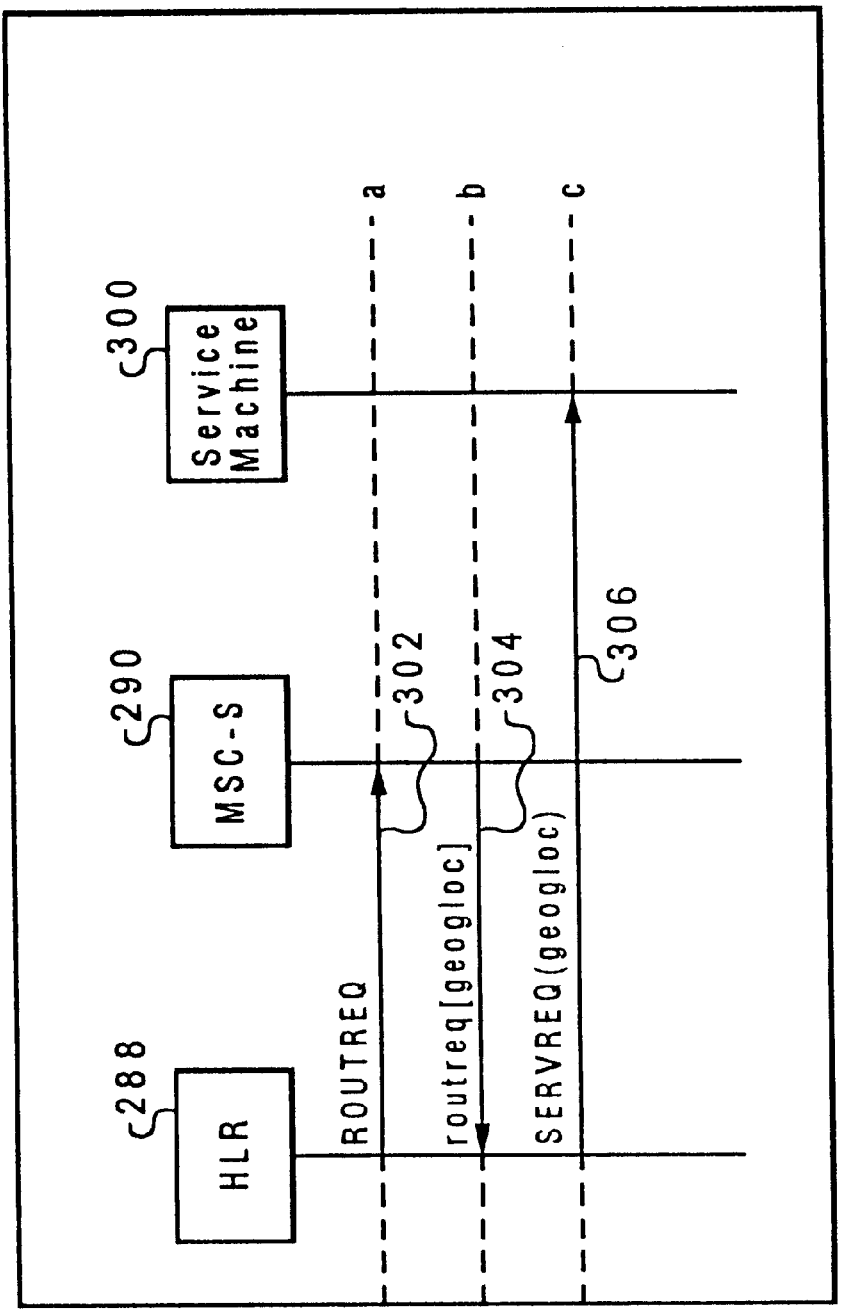
FIG. 12 illustrates a message flow diagram of the flow for delivering the terminator's geographic location in accordance with a preferred embodiment of the present invention.

FIG. 12 illustrates one such technique. FIG. 12 is a message flow diagram 292 of the flow for delivering the terminator's location in accordance with a preferred embodiment of the present invention. HLR 288, analogous to the other HLRs described herein, is responsible for sending the "ROUTREQ" to MSC-S 290, requesting that MSC-S 290 determine the location of the mobile cellular telephone and report back. Upon receiving the "routreq" (i.e., response), HLR 288 is responsible for passing the geographic location received to the service machine 300 in the "SERVREQ," indicated at arrow 306. Step a indicates that HLR 288 requests MSC-S 290 to setup a call delivery to the mobile cellular telephone and to determine the mobile cellular telephone's current geographic location by sending an "ROUTREQ" message, as indicated at arrow 302.

As indicated at step b, MSC-S 290 determines the current geographic location of the mobile cellular telephone, which can include paging. MSC-S 290 sets up a call for delivery and reports the geographic location of the mobile cellular telephone in the "routreq," as indicated at arrow 304. MSC-S takes other appropriate action to prepare for termination, which includes maintaining the mobile cellular telephone ready for termination. As indicated at step c, HLR 288 reports the terminator's current geographic location to service machine 300 in the "SERVREQ" message, as indicated by arrow 306. The "SERVREQ" message includes both the originator's geographic location and the terminator's geographic location for this technique.

Figure 13:
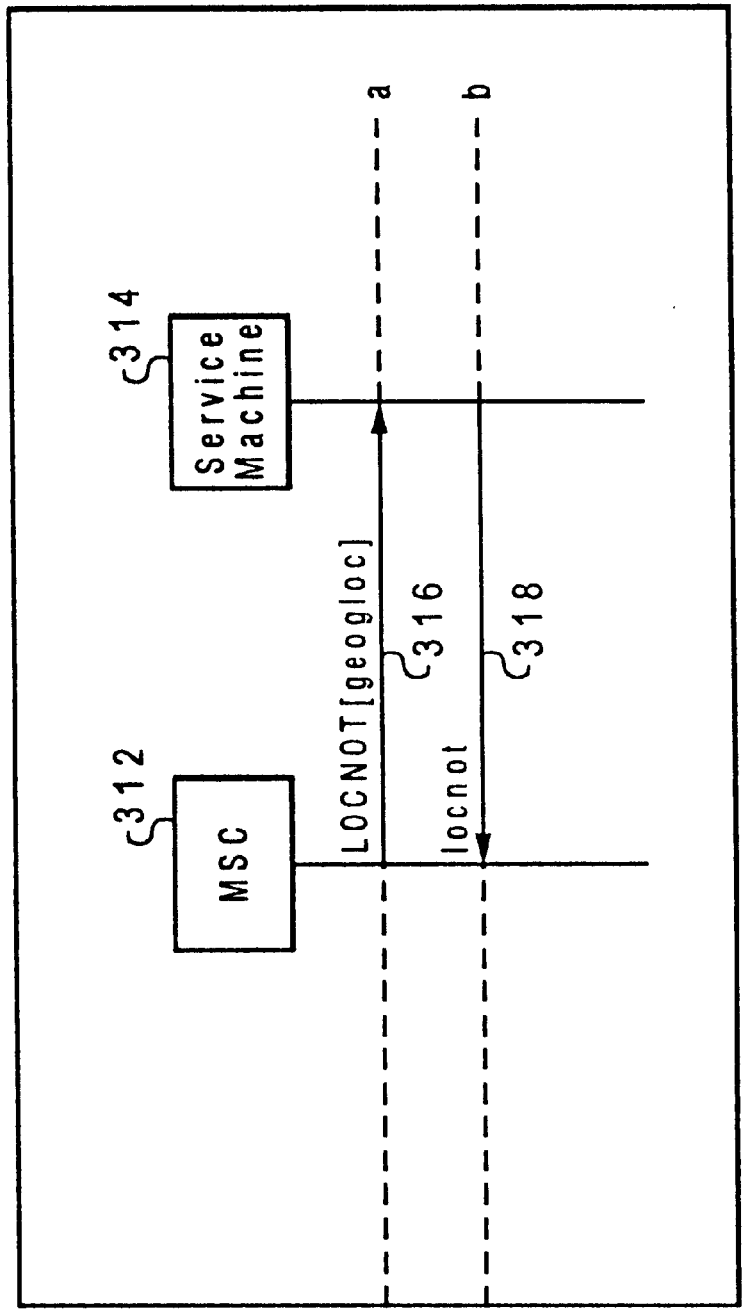
FIG. 13 depicts a message flow diagram of the flow for delivering the terminator's geographic location on a continuous basis in accordance with a preferred embodiment of the present invention.

FIG. 13 depicts a message flow diagram 310 of the flow for delivering the terminator's geographic location on a continuous basis in accordance with a preferred embodiment of the present invention. In this particular example, the MSC-S (i.e. serving MSC) and the service machine are involved. The MSC-S takes the geographic location that it has determined, and delivers this information to the service machine continuously, which can be based on time, distance moved, and so forth. The service machine receives the location information and stores that information for utilization when a call is received in the future. FIG. 13 thus depicts a messaging sequence that can be utilized by the MSC-S and the service machine to transfer the geographic location information.

As indicated at step a and by arrow 316, if the profile indicates that the MS (i.e., mobile station) has this service, and it is appropriate (i.e., time has expired, mobile station has moved sufficiently, or other triggers) that the MSC inform the service machine of the new location of the MS, then MSC 312 sends a location notification ("LOCNOT") message to service machine 314. The MS (i.e., mobile station) includes interface equipment utilized to terminate the radio path at the user side. It provides the capabilities to access network services by the user. As indicated at step b and by arrow 318, service machine 314 stores the new location of the MS and returns a "locnot" to MSC 312. Service machine 314 is analogous to service machine 248 of FIG. 9. Although described as a service machine in the example of FIG. 13, this is not a necessary feature of the present invention. In the example of FIG. 13, however, MSC 312 is analogous to MSC-S 252 of FIG. 9.

Determining appropriate action to take following location delivery on a continuous basis is a part of the service in which only the service machine is chiefly involved. The service machine takes the reported location of the originator, the reported location of the terminator, the calling line ID (i.e., identity of the originating terminal), and the number dialed (e.g. terminator's business number or personal number), and executes a service algorithm. The service machine determines whether the call will be allowed to be processed or not.

There are many ways the service machine may come to a decision. The service machine can determine that the phones are close enough together to allow the call to continue. The service machine can also determine whether or not the phones are located in the same city/block/area, etc. Further, the service machine can decide that the originator need not necessarily be restricted to a particular area (e.g., a plumber may want his/her spouse to be able to talk to him/her without considering location). The service machine can also decide that the particular number dialed is or is not appropriate for location restriction (e.g., the business number is not restricted by location, but the personal number is restricted by location).

After processing the service algorithm, the service machine then has the information necessary to determine whether the call will be allowed to terminate as normal (i.e., the call will be processed and routed to the terminator), or alternative action is to be taken. Alternative action can include, for example, routing the call to voice mail, routing to a dispatcher, routing to another member of a particular group who is located closer to the originator than the originally dialed terminator (e.g. routing the call to a closer plumber), or playing a pre-recorded message announcing that the terminator is not currently located close to the originator to service the call.

These alternative actions are, of course, presented herein only as illustrative examples. Other alternative actions can be implemented in accordance with a preferred embodiment of the present invention. In executing the appropriate action to be taken, the service machine, the HLR, and the MSC-O are involved in this portion of the service. The serving machine is responsible for taking the appropriate action it has determined, and for transforming that information into appropriate instructions. The HLR is responsible for receiving these instructions and carrying them out. The HLR is responsible for informing the MSC-O the type of termination appropriate for the call. The MSC-O is responsible for providing the call with the type of termination specified by the instructions.

FIG. 14 depicts a message flow diagram 320 of the flow for delivering call processing instructions in accordance with a preferred embodiment of the present invention. Message flow diagram 320 shows a messaging sequence utilized to provide instructions that will result in an appropriate termination. As indicated at step a and by arrow 324, service machine 326 takes the appropriate action determined earlier and transforms it into IS-41 instructions. IS-41 is the "Cellular Radiotelecommunications Intersystem Operations" manual, utilized by those skilled in the art to implement cellular telephone systems. Service machine 326 sends the instructions in the "servreq" message, which is the result message to the SERVREQ sent earlier (i.e. arrow 306 of FIG. 12). Service machine 326 is analogous to service machine 248 of FIG. 9.

As indicated at step b, HLR 328 receives the instructions from service machine 326 and executes these instructions. The instructs may require HLR 328 to send additional messages to other nodes. HLR 328 is analogous to HLR 246 of FIG. 9. When HLR 328 finishes processing its portion of the instructions, HLR 328 then sends an "locreq" message, which is the result message to the LOCREQ sent earlier (i.e. arrow 276 of FIG. 11), to MSC-O 330 informing MSC-O 330 of steps that it must now take in order to continue processing the call. MSC-O 330 is analogous to MSC-O 244 in FIG. 9. "Locreq" is indicated by arrow 322. MSC-O 320 receives the "locreq" and provides the appropriate call termination as instructed.

Preferred implementations of the invention can include implementations to execute the method or methods described herein as a program product residing in a memory of microcomputer 130, as depicted at FIG. 2. Alternatively, a preferred embodiment of the present invention can include a program product residing in a microcomputer memory located at the MSC. In either case, the program product includes sets of instructions for executing the method and methods described herein. Until required by the microcomputer, the set of instructions may be stored as a computer-program product in another computer memory, for example, in a disk drive attached to the microcomputer (which may include a removable memory such as an optical disk or floppy disk for eventual use in the disk drive).

Further, the computer-program product can also be stored at another computer and transmitted when desired to the user's workstation by a network or by an external network. One skilled in the art can appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Note that the invention describes terms such as determining, terminating, completing or other such terms that could be associated with a human operator. However, for at least a number of the operations described herein which form part of at least one of the embodiments, no action by a human operator is desirable. As indicated herein, these operations described are, in large part, machine operations processing electrical signals to generate other electrical signals. Thus, a method for implementing the steps depicted in FIG. 6, FIG. 7, and FIG. 8 can be accomplished with a computer-aided device.

It is important to note that it is not a necessary feature of the present invention that both parties in a wireless communications transaction be mobile cellular telephone users. In particular, an originator does not necessarily have to be a mobile cellular telephone. For example, if a terminator is a mobile cellular telephone, and an individual located in a different city calls the terminator, the terminator may desire the call routed to a central dispatcher in order to service the call quickly. In this case, the originator may be a mobile cellular telephone located in the other city, or the originator may be a fixed landline that is always located in the other city. Thus, those skilled in the art will appreciate that the present invention is useful to a terminator regardless of the specific telephone type utilized by an originating user to initiate a communications transaction to the terminator.

The embodiments and examples set forth herein are presented in order to best explain the present invention and its practical application and to thereby enable those skilled in the art to make and utilize the invention. However, those skilled in the art will recognize that the foregoing description and examples have been presented for the purposes of illustration and example only. For example, the present invention can be utilized in accordance with wireless communication systems in general, not only a cellular form of wireless communication systems. The description as set forth is not intended to be exhaustive or to limit the invention to the precise form disclosed. Many modifications and variations are possible in light of the above teaching without departing from the spirit and scope of the following claims.

What is claimed is:

1. A method in a wireless communications network for restricting communication transactions based on the geographic location of originators and terminators within said wireless communications network, comprising the steps of:
   initiating a communications transaction;
   in response to initiating said communications transaction, determining a geographic location of an originator of said communications transaction;
   determining a geographic location of each of a plurality of possible terminators of said communications transaction;
   automatically comparing said geographic location of said originator to said geographic location of each of said plurality of possible terminators;
   completing said communications transaction to a single selected terminator among said plurality of possible terminators based upon a selected proximity of said geographic location of said originator to said geographic location of said single selected terminator; and
   providing alternative action to said communications transaction in response to a lack of proximity of said geographic location of said originator to said geographic location of any terminator within said plurality of possible terminators.

2. The method of claim 1 further comprising the steps of:
   designating a specified region;
   determining a range of said specified region,
   if said geographic location of said originator is located outside a range of said specified region, thereafter terminating said initiation of said communications transaction; and
   if said communications transaction is located within a range of said specified region, allowing said communications transaction to continue.

3. A system in a wireless communications network for restricting communication transactions based on the geographic location of originators and terminators within said wireless communications network, comprising the steps of:
   means for initiating a communications transaction;
   means for determining a geographic location of an originator of said communications transaction, in response to initiating said communications transaction;
   means for determining a geographic location of each of a plurality of possible terminators of said communications transaction;
   means for automatically comparing said geographic location of said originator to said geographic location of each of said plurality of possible terminators;
   means for completing said communications transaction to a single selected terminator among said plurality of possible terminators based upon a selected proximity of said geographic location of said originator to said geographic location of said single selected terminator; and
   means for providing alternative action to said communications transaction in response to a lack of proximity of said geographic location of said originator to said geographic location of any terminator within said plurality of possible terminators.

4. The system of claim 3 further comprising:
   means for designating a specified region;
   means for determining a range of said specified region;
   means for terminating said initiation of said communications transaction, if said geographic location of said originator is located outside a range of said specified region; and
   means for allowing said communications transaction to continue, if said communications transaction is located within a range of said specified region.

5. A program product residing in computer memory in a computer system in a wireless communications network for restricting communication transactions based on the geographic location of originators and terminators within said wireless communications network, said program product comprising:
   means for initiating a communications transaction;
   means for determining a geographic location of an originator of said communications transaction, in response to initiating said communications transaction;
   means for determining a geographic location of each of a plurality of possible terminators of said communications transaction;
   means for automatically comparing said geographic location of said originator to said geographic location of each of said plurality of possible terminators;
   means for completing said communications transaction to a single selected terminator among said plurality of possible terminators based upon a selected proximity of said geographic location of said originator to said geographic location of said single selected terminator; and means for providing alternative action to said communications transaction in response to a lack of proximity of said geographic location of said originator to said geographic location of any terminator within said plurality of possible terminators;
signal bearing media bearing:
  said means for initiating a communications transaction;
  said means for determining a geographic location of an originator of said communications transaction, in response to initiating said communications transaction;
  said means for determining a geographic location of each of a plurality of possible terminators of said communications transaction;
  said means for automatically comparing said geographic location of said originator to said geographic location of each of said plurality of possible terminators;
  said means for completing said communications transaction to a single selected terminator among said plurality of possible terminators based upon a selected proximity of said geographic location of said originator to said geographic location of said single selected terminator; and
  said means for providing alternative action to said communications transaction in response to a lack of proximity of said geographic location of said originator to said geographic location of any terminator within said plurality of possible terminators.

6. The program product of claim 5 further comprising:

means for designating a specified region;

means for determining a range of said specified region;

means for terminating said initiation of said communications transaction, if said geographic location of said originator is located outside a range of said specified region; and means for allowing said communications transaction to continue, if said communications transaction is located within a range of said specified region.

7. The program product of claim 6 further comprising:

said signal bearing media further comprising signal bearing media bearing:
  means for designating a specified region;
  means for determining a range of said specified region;
  said means for terminating said initiation of said communications transaction, if said geographic location of said originator is located outside a range of said specified region; and
  said means for allowing said communications transaction to continue, if said communications transaction is located within a range of said specified region.

8. The program product of claim 7 wherein said signal bearing media further comprises transmission media.

9. The program product of claim 7 wherein said signal bearing media further comprises recordable media.

* * * * *